US006763147B1

(12) United States Patent
Koenig et al.

(10) Patent No.: US 6,763,147 B1
(45) Date of Patent: Jul. 13, 2004

(54) IMAGE FORMATION PROCESS

(75) Inventors: Anne Koenig, St Martin d'Viage (FR); Jean-Marc Dinten, Lyons (FR); Alain Gliere, Grenoble (FR); Corinne Mestais, La Terrasse (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/550,593

(22) Filed: Apr. 17, 2000

(30) Foreign Application Priority Data

May 6, 1999 (FR) ........................................... 99 05775

(51) Int. Cl.[7] ................................................ G06K 9/36
(52) U.S. Cl. .................................. 382/289; 250/371.01
(58) Field of Search ................................ 382/276, 289, 382/291, 299, 300, 307, 211, 132, 144, 145, 147, 149, 225; 250/370.01, 369, 363.07, 363.09, 252.1; 378/34; 327/90; 348/241

(56) References Cited

U.S. PATENT DOCUMENTS 4,672,542 A * 6/1987 Roux et al. ................... 378/34
5,491,342 A * 2/1996 Lim et al. .............. 250/363.09
5,508,524 A * 4/1996 Goldberg et al. ........... 250/369
5,576,547 A * 11/1996 Ferreira et al. ............. 250/369
5,847,398 A * 12/1998 Shahar et al. .......... 250/370.09
6,025,875 A * 2/2000 Vu et al. ..................... 348/241
6,091,070 A * 7/2000 Lingren et al. ........ 250/370.09

* cited by examiner

*Primary Examiner*—Jayanti K. Patel
*Assistant Examiner*—Seyed Azarian
(74) *Attorney, Agent, or Firm*—Oblon, Spivak, McClelland, Maier & Neustadt, P.C.

(57) ABSTRACT

The invention relates to a process for the formation of an image obtained from an array of detector pixels comprising at least one detector pixel, the image formed constituted by at least one set of P image pixels for each detector pixel, characterized in that it successively comprises:

a stage (E2) making it possible to create N elementary pixels from one detector pixel, N being an integer equal to or lower than P and a stage (E3) of the random distribution of events received by a detector pixel in the N elementary pixels corresponding thereto.

The invention applies to the field of medical imaging.

10 Claims, 2 Drawing Sheets

E1

E2

E3

IMAGE FORMATION PROCESS

TECHNICAL FIELD AND PRIOR ART

The invention relates to a process for the formation of an image obtained by a camera and comprising an array of detector pixels.

The invention more particularly applies to the field of medical imaging using gamma cameras integrating a detector in the form of an array of pixels based on CdZnTe or CdTe semiconductor material.

The array of detector pixels of a gamma camera is constituted by regularly spaced pixels, surmounted by a collimator, preferably having square holes.

The collimator is placed in front of the array of pixels in order to only retain the radiation having an incidence perpendicular to the surface of the pixels. The semiconductor detectors directly convert the energy of the gamma photons into charge carriers. The collection of the charge carriers takes place by means of contacts deposited on each pixel and to which is applied a high bias voltage. The amplification and shaping of the signal are then effected by an electronic circuit, whose digital output supplies the value allocated to the image pixel.

Therefore the response of a pixel of the array corresponds to the sum of the gamma events received at the surface of the pixel.

The image produced by a gamma camera detector constituted by CdZnTe or CdTe semiconductor material pixels has a very pronounced "mosaic" appearance. This "mosaic" appearance is very disadvantageous compared with the continuous appearance of the image produced by an Anger detector.

An Anger detector makes it possible to transform the incident gamma rays into light and then electric pulses, define the location of the gamma photons which have interacted and measure the deposited energy. An Anger detector is constituted by a collimator, a scintillator crystal, a light guide, photomultiplier tubes and locating electronics.

The holes of the collimator, perpendicular to the scintillator surface, only permit the passage of rays normal to the entrance plane of the detector. The scintillator-light guide assembly makes it possible to transform the incident gamma photons into light photons and distribute the light over several photomultipliers. The light photons are emitted isotropically, their number following Poisson's law. The photomultipliers transform these light photons into electrons, whose number is then multiplied by dynodes. The number of photoelectrons emitted also follows Poisson's law.

The locating electronics calculates a barycentre of contributions of photomultipliers, whose significances correspond to their geographical position on the crystal and the resulting image is therefore created by sampling these responses.

An object of the invention is to implement a process enabling the images from an array of gamma camera detector pixels to have a quality like that of images from an Anger camera.

The invention relates to a process for the formation of an image obtained from an array of detector pixels comprising at least one detector pixel, the image formed being constituted by at least one set of P image pixels for each detector pixel. The process comprises:

- a stage making it possible to create N elementary pixels from one detector pixel, N being an integer equal to or lower than P and
- a stage of randomly distributing events received by each detector pixel in the N image pixels corresponding thereto.

An advantage of the invention is that of eliminating the "mosaic" appearance of the image produced by a gamma camera.

BRIEF DESCRIPTION OF THE DRAWINGS

Other features and advantages of the invention can be gathered from reading the following preferred embodiments with reference to the attached drawings, wherein show.

In all the drawings, the same references designate the same elements.

DETAILED DESCRIPTION OF EMBODIMENTS OF THE INVENTION

Figure 1:
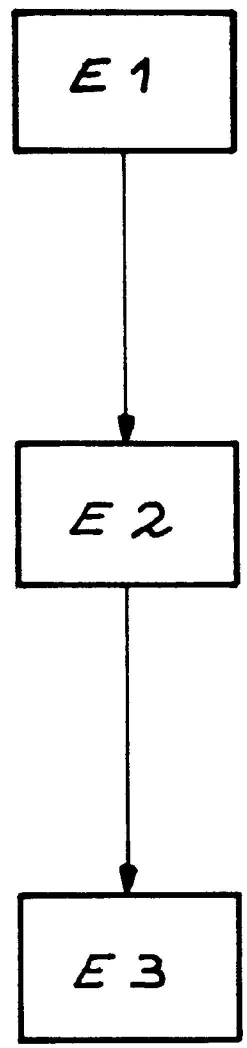
FIG. 1 Different stages of a first embodiment of a process for forming an image according to the invention.

FIG. 1 shows the different stages E1, E2, E3 of a first embodiment of the image formation process according to the invention.

A first stage E1 is an information acquisition stage by each of the detector pixels.

A second stage E2, following stage E1, consists of creating P image pixels for each of the detector pixels, P being an integer equal to or higher than 2.

According to the preferred embodiment of the invention, stage E2 makes it possible to construct, from gamma camera detector pixels, an image, whereof the image pixels have the size of the image pixels of an Anger camera.

Pixels based on the CdZnTe semiconductor of a gamma camera can e.g. have a size of $3.9\times3.9$ $mm^2$ and can be arranged with a spacing of 4.445 mm. The normal size of image pixels of an Anger camera is $0.1\times0.1$ $mm^2$.

According to the invention and in the form of a non-limitative example, it follows that P image pixels from stage E2 can constitute a square matrix of 42×42 image pixels. Stage E2 is then a ratio 42 oversampling stage in two perpendicular directions defining the square matrix of image pixels. The oversampling stage E2 can be performed by different interpolation methods.

A third stage E3 consists of recovering the events received by each detector pixel so as to redistribute them in random manner in the P image pixels corresponding thereto. According to this third stage, the information from a detector pixel is preferably distributed according to a uniform law. The information distribution is then a Poisson's distribution.

This third stage advantageously makes it possible for the image formed to have a "critical definition" very close to that of an image obtained by an Anger camera.

Figure 2A:
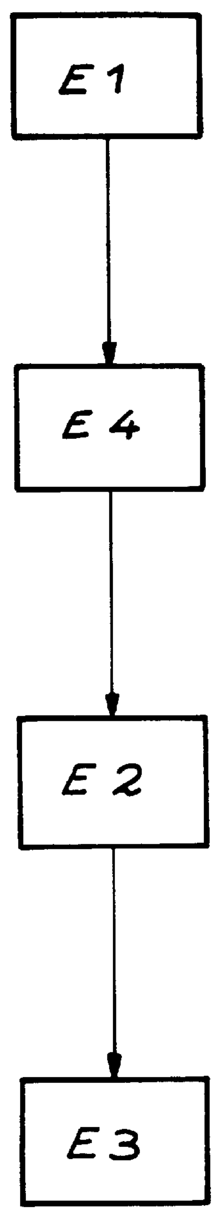
FIGS. 2*a* In each case a variant of a second embodiment of the image and 2*b* formation process according to the invention.
Figure 2B:
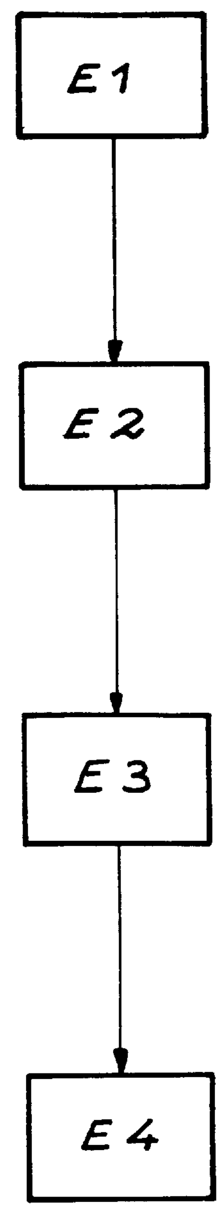

FIGS. 2*a* and 2*b* show in each case a variant of a second embodiment of the image formation process according to the invention.

According to the second embodiment of the image formation process according to the invention, it is possible to attenuate or eliminate the visible limits of each detector pixel on the image formed.

To this end, a supplementary, bicubic interpolation stage is performed. Bicubic interpolation makes it possible to find a cubic interpolation function for the sampling coordinates x and y of an image I, retaining the values of the image, primary $$\frac{\partial I}{\partial x}, \frac{\partial I}{\partial y} \text{ and mixed } \frac{\partial^2 I}{\partial x \partial y}$$

derivatives at the initial sampling points and enable said values to vary continuously at the boundaries of the pixels.

According to a first variant of the second embodiment of the invention, the bicubic interpolation stage E4 precedes an oversampling stage E2. This first variant is illustrated in FIG. 2*a*.

The bicubic interpolation stage E4 then makes it possible to create P1 first, intermediate pixels from each detector pixel and the oversampling stage E2 makes it possible to create P2 second, intermediate pixels from each first, intermediate pixel, the product P1×P2 being equal to P.

The bicubic interpolation stage is a Nb ratio interpolation stage and the oversampling stage a ratio Ns interpolation stage. According to the aforementioned example for which each detector pixel is divided into P image pixels constituting a square matrix of 42×42 image pixels, the interpolation ratios Nb and Ns can e.g. be respectively equal to 6 and 7.

In general terms, in the case where the P image pixels constitute a square matrix if n×n image pixels, the ratios Nb and Ns are such that Nb×Ns=n.

According to the first variant of the second embodiment of the process according to the invention, the stage E3 of distributing events received takes place after stage E2.

According to the invention, the visual impression given by the resulting image is free from any pixel boundary effect. Moreover, as stated hereinbefore, the image formed has a "critical definition" very close to that obtained by an Anger camera.

Advantageously, the choice of the respective significances of the ratios Nb and Ns makes it possible to define the signal-to-noise ratio of the image formed. Such a choice is a simple and effective means for adjusting the "critical definition" of the image.

According to the second variant of the second embodiment of the invention, the bicubic interpolation stage succeeds the random distribution stage E3. This second variant is illustrated in FIG. 2*b*.

According to the second variant, stage E2 of the process of forming an image according to the invention makes it possible to create N pixels, N being a number lower than P.

The bicubic interpolation stage E4 makes it possible to create P3 intermediate pixels from each of the N elementary pixels, the product N×P3 being equal to P.

In general terms, as for the first variant, in the case where the P image pixels constitute a square matrix of n×n image pixels, the oversampling stage E2 and bicubic interpolation stage E4 are interpolation stages of respective ratios Ns and Nb such that Ns×Nb=n, with P=n×n.

We claim:

1. Process for formation of an image (I) obtained from an array of detector pixels comprising at least one detector pixel, the image formed constituted by at least one set of P image pixels for each detector pixel, P≧2, characterized in that it successively comprises:

a stage (E2) making it possible to create N elementary image pixels from an image obtained from a single detector pixel, N being an integer ≧2 and equal to or lower than P, and a stage (E3) of the random distribution of events received by a detector pixel in the N elementary image pixels corresponding thereto.

2. Process according to claim 1, characterized in that the stage making it possible to create N elementary image pixels from an image obtained from one detector pixel is a detector pixel oversampling stage.

3. Process according to claim 1, characterized in that stage (E2) making it possible to create N elementary image pixels from an image obtained from one detector pixel successively comprises:

an interpolation stage (E4) making it possible to create P1 first intermediate image pixels from each detector pixel and making it possible to attenuate or eliminate the visible limits of each detector pixel, an oversampling stage (E2) making it possible to create P2 second intermediate image pixels from each first intermediate image pixel, the product P1×P2 being equal to P.

4. Process according to claim 3, characterized in that the interpolation stage (E4) making it possible to create P1 first intermediate image pixels from each detector pixel and making it possible to attenuate or eliminate the visible limits of each detector pixel is a bicubic interpolation stage.

5. Process according to claim 1, characterized in that it comprises a supplementary stage succeeding the stage (E3) of the random distribution of the events received by a detector pixel, the supplementary stage being an interpolation stage (E4) making it possible to create P3 intermediate image pixels from each of the N elementary image pixels and making it possible to attenuate or eliminate the visible limits of each detector pixel, the product N×P3 being equal to P.

6. Process according to claim 5, characterized in that the interpolation stage (E4) making it possible to create P3 intermediate image pixels from each of the N elementary image pixels and making it possible to attenuate or eliminate the visible limits of each detector pixel is a bicubic interpolation stage.

7. Process according to any one of the preceding claims, characterized in that the random distribution stage involves a Poisson's distribution of the events received.

8. Process according to any one of the preceding claims, characterized in that the detector pixels are CdZnTe or CdTe semiconductor material pixels.

9. Process according to any one of the preceding claims, characterized in that a set of P image pixels constitutes a square matrix of n×n image pixels.

10. Process according to claim 9, characterized in that n=42.

* * * * *